June 16, 1936.  W. A. LEWIS ET AL  2,044,174

PROTECTIVE RELAY SYSTEM

Filed March 11, 1933  2 Sheets-Sheet 1

INVENTORS.
William A. Lewis &
Robert D. Evans.
BY
O. B. Buchanan
ATTORNEY

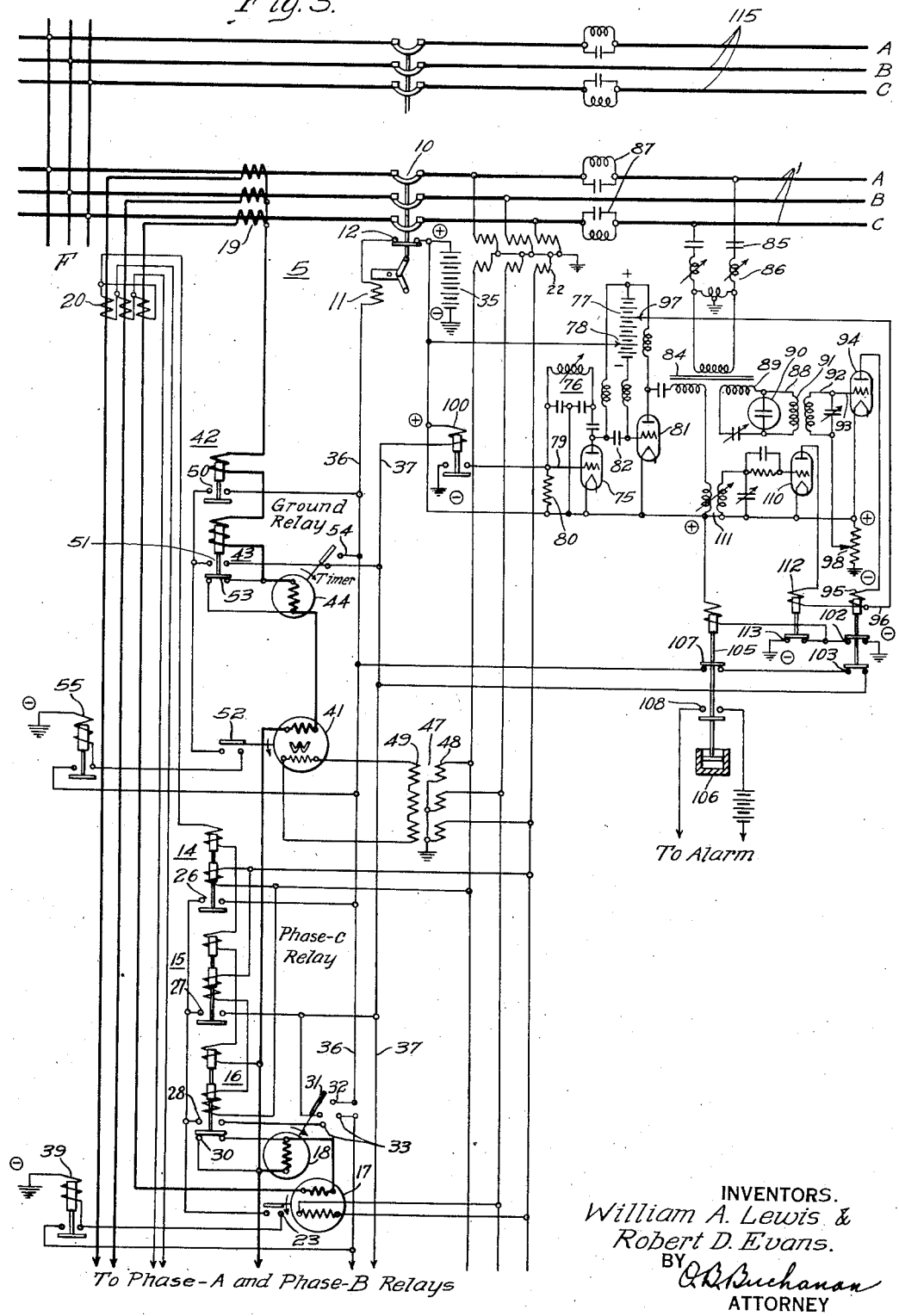

Patented June 16, 1936

2,044,174

UNITED STATES PATENT OFFICE 2,044,174

PROTECTIVE RELAY SYSTEM

William A. Lewis, Wilkinsburg, and Robert D. Evans, Swissvale, Pa., assignors to Westinghouse Electric & Manufacturing Company, East Pittsburgh, Pa., a corporation of Pennsylvania Application March 11, 1933, Serial No. 660,342

34 Claims. (Cl. 175—294)

Our invention relates to protective relay systems for transmission lines and it has particular relation to the effective use of an intelligence-communication channel between the two ends of the line-section being protected for securing instantaneous circuit-breaker operation, at both ends of the line-section, for all faults occurring within that line-section.

Our new system is based fundamentally upon the use of line-frequency relays which achieve final selectivity of the breakers which should trip, by the use of one or more steps of time delay. According to our invention, we supplement this line-frequency relaying equipment by the use of a signal communicated from the far end of the line-section so as to eliminate the element of time delay.

In accordance with our invention, we also preferably provide means for locking out the communicating-channel relaying elements in the event of the failure of the latter, so that the line-section being protected will at least receive the normal protection afforded by ordinary line-frequency relaying equipment.

Although not limited to any particular kind of intelligence-communicating channel between the two ends of the line-section being protected, our invention is particularly adapted to a system utilizing a single carrier-current frequency which is impressed upon the line-section at each end thereof.

The object of our invention is to provide apparatus and system-means for utilizing a communication channel, and in particular, a carrier-current communication channel, in a manner which will combine the highest reliability with the greatest simplicity in construction and accuracy in operation.

With the foregoing and other objects in view, our invention consists in the apparatus, circuits, systems, and methods hereinafter described and claimed, and illustrated in the accompanying drawings wherein:

Figure 1:
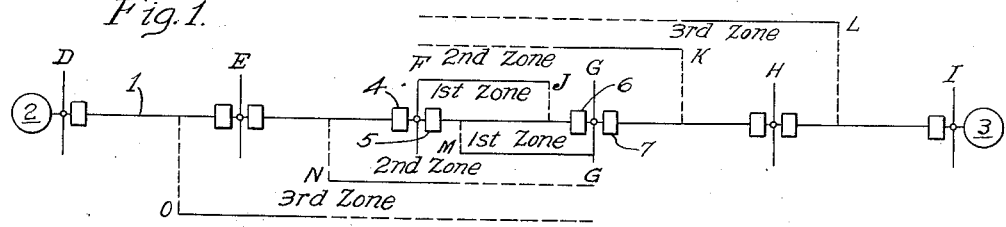
Figure 1 is a diagrammatic view illustrative of the different time zones of the line-frequency relays.

In Fig. 1 is given a schematic diagram of a single-circuit line connecting two synchronous machines 2 and 3. The transmission line connecting the two machines 2 and 3 is indicated at 1, and it is indicated by means of a single conductor, although it will be understood that, in general, it will be a 3-phase line, and in general, also, it will be a multiple-circuit line composed of a plurality of 3-phase circuits in parallel. The transmission line is divided into a plurality of line-sections by means of sectionalizing stations D, E, F, G, H, I. Each line-section is provided, at both of its ends, with relaying and circuit-breaker equipments which are indicated by the small rectangles 4, 5, 6, 7, etc. in Fig. 1.

The line-frequency relaying equipment, represented by each one of these rectangles 4, 5, 6, 7, etc. in Fig. 1, is provided with fault-responsive relaying equipment for responding to faults in three different zones. Thus the first distance-element of the equipment at station 5 responds to faults in the zone F—J, which is less than the distance between the two ends F, G, of the line-section being protected. The second distance-element responds to faults lying in the zone F—K, which is more than the distance between the two ends F, G, of the line-section being protected. A third distance-element is usually provided, for back-up protection, responding to faults lying in a still wider zone, as indicated at F—L.

In like manner, the relaying equipment 6, at the other end of the line-section F—G under consideration, is also divided into three zones, G—M, G—N, and G—O, as indicated in Fig. 1.

The equipment included in the several relaying and circuit-breaker equipments represented by the little rectangles in Fig. 1 are, or may be, all alike, so that a description of one will suffice for all.

Figure 2:
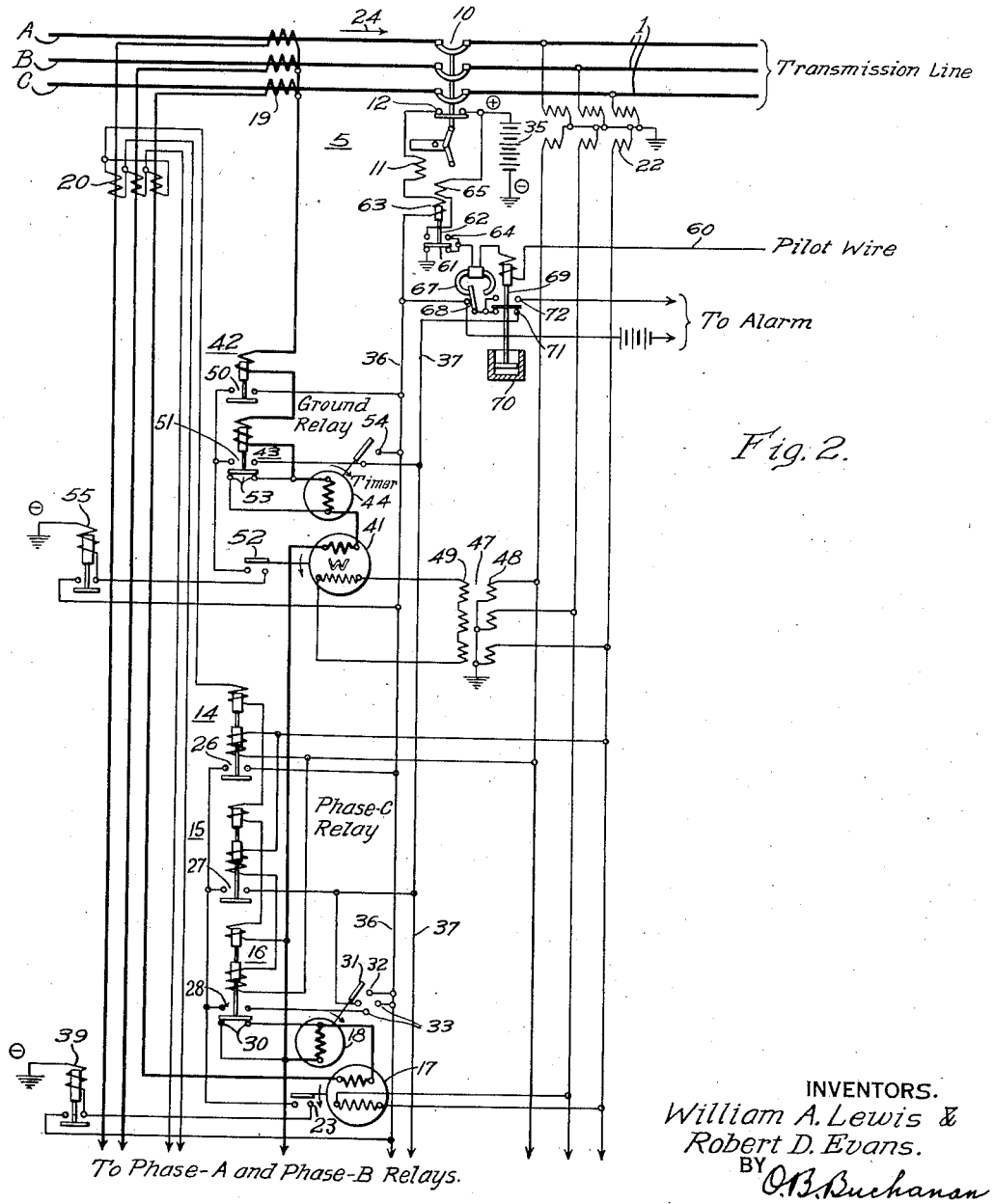
Fig. 2 is a diagrammatic view of circuits and apparatus showing our invention in a system utilizing a pilot wire for the communicating channel; and, Fig. 3 is a similar view illustrating our invention in a system utilizing a single carrier-current frequency as the means for obtaining a communicating channel between the two ends of the line-section being protected.

Fig. 2 shows the relaying and circuit-breaker equipment at station 5 of Fig. 1. The 3-phase transmission line 1, having phases A, B, and C, is shown as having a line-sectionalizing circuit-interrupter means in the form of a circuit breaker 10 which is provided with a tripping coil 11 and an auxiliary contact 12 for finally interrupting the circuit of the tripping coil when the breaker is opened. The normal line-frequency relaying equipment for controlling the tripping of the circuit breaker 10 comprises a ground-relay for responding to ground faults, and three phase-relays for responding to the delta currents in each of the phases A, B, and C of the transmission line. For the sake of simplicity, only the ground-relay and the phase-C relay are shown in Fig. 2.

The phase-A and phase-B relays will be similar to the phase-C relay, with suitable changes in the phase connections, as will be obvious, in accordance with well-known practice in connection with line-frequency relaying equipment.

The phase-C relay comprises three fault-responsive impedance elements or distance elements 14, 15 and 16, a directional wattmeter element 17, and a timer 18. The current coils of the impedance and directional elements, and the timer, are all energized from three main star-connected current transformers 19 so as to respond to the currents in the three phases A, B and C of the transmission line 1. In order that the current coils of the distance elements may be supplied with delta currents, they are energized from three delta-connected auxiliary current transformers 20 which are connected in series with the main current transformers 19. The voltage coils of the impedance and directional elements are energized from any suitable potential-transformer means 22 so as to respond to the transmission-line potentials.

The directional element 17 is arranged to quickly close its contacts 23 when the power-current direction is out into the line-section being protected, as indicated by the arrow 24 placed over the transmission line.

The three impedance elements 14, 15 and 16 respond to faults in the first, second and third zones, respectively, as previously described in connection with Fig. 1, operating quickly, that is, without intentional time-delay, to close their several contacts 26, 27 and 28 if a phase-to-phase fault occurs in their phases anywhere in the zones to which they respond.

The timer 18 may be a synchronous motor which operates at a speed determined by the frequency of the line-current. It is usually connected in series-circuit relation with the current coil of the directional element 17, by means of a small auxiliary transformer, which has been omitted for the sake of simplicity in Fig. 2. The timer 18 is normally short circuited by means of auxiliary contacts 39 on the third distance element 16. As soon as a fault occurs anywhere within the third zone, which includes also the first and second zones, the timer begins to rotate, and its moving contact element 31 comes successively into contact with the stationary contacts 32 and 33, with certain predetermined time-delays. The first timer-contacts 32 are usually made at the end of about 15 cycles, if the circuit breaker 10 is capable of clearing within about 10 or 12 cycles, so that these timer contacts will not be made until after the circuit breaker in another line-section has had a chance to open, if it is going to open, as will subsequently be described. The second timer-contacts 33 usually close after a delay about twice as long as the first timer-contacts 32.

The tripping energy for the tripping coil 11 of the circuit breaker 10 is supplied by means of a station battery 35. The relaying equipment, according to our invention, is connected so as to energize two different control circuits, namely a tripping circuit 36, and a relay circuit 37 which we have added for the purpose of securing our communication-channel control.

The tripping circuit 36 is energized in any one of a number of different ways. In the first place, in response to the simultaneous actuation of the directional element 17 and the first impedance element 14, the tripping circuit 36 is energized through a circuit which may be traced through the contacts 26 of the first impedance element 14 and the contacts 23 of the directional element 17, returning to the negative terminal of the battery 35 through the operating coil of a contactor 39 which serves as a holding relay for by-passing the lighter contacts of the impedance and directional relays, thus maintaining the energization of the tripping circuit 36 until the latter is deenergized by the opening of the auxiliary breaker contact 12 at the conclusion of the circuit-opening operation.

The tripping circuit 36 is also energized, after a time-delay, through a circuit which may be traced through the first timer-contacts 32, the contacts 27 of the second impedance element 15, and the contacts 23 of the directional element 17. A third circuit for energizing the tripping circuit 36, by means of the phase-C relay, may be traced through the second timer-elements 33, the contacts 28 of the third impedance element 16 and the contacts 23 of the directional element 17.

The relay circuit 37 is connected to be energized only by the simultaneous operation of the directional element 17 and the second distance element 15, the circuit being made through the contacts 27 of the second distance element 15 and the contacts 23 of the directional element 17, being completed through the contactor 39 to the negative battery terminal (—). It will thus be noted that we have provided two circuits 36 and 37 which, if connected together, will short-circuit the first contacts 32 of the timer 18, so that, under such circumstances, the tripping circuit 36 will be energized instantaneously in response to the simultaneous actuation of the directional element 17 and the second distance element 15.

It will be understood that two other relays, similar to the phase-C relay, will be utilized for securing complete protection against faults occurring between the phases of the transmission line section to be protected.

For protection against ground faults, we have illustrated, by way of example, a zero-sequence directional overcurrent relay called the ground relay and consisting of a directional wattmeter element 41, two zero-sequence overcurrent elements 42 and 43, and a timer 44. The current coil of the zero-sequence directional element 41, the coils of the zero-sequence overcurrent elements 42 and 43 and the timer 44 are all energized from the neutral currents in the star-point connection of the main current transformer 19. The voltage coil of the zero-sequence directional element 41 is energized from a set of auxiliary potential transformers 47 having star-connected primary windings 48 which are connected to the terminals of the main potential transformer 22, and open delta-connected secondary windings 49, the delta-connection of which is completed by the voltage coil of the directional element 41, so as to supply the latter with zero-sequence voltage.

The first zero-sequence overcurrent element 42 has a higher current setting than the second element 43, so as to close its contacts 50 only in case the ground fault is closer to the relay than would be necessary to close the contacts 51 of the second overcurrent element 43. On a typical solidly-grounded high-voltage transmission system, the zero-sequence current is a fairly accurate measure of the distance of the fault, so that this type of zero-sequence overcurrent relay protection may be utilized to protect against ground faults instead of more complex distance-responsive ground impedance relays, such as that shown in Lewis Patent No. 1,897,022, granted February 7, 1933, which may be substituted for our ground relay if desired.

The zero-sequence directional element 41 will be actuated, to close its contacts 52, when the fault currents are in such direction as to indicate that the fault is out on the line away from the relaying station, as distinguished from fault currents which flow in from the line, through the relaying station, and on to some location back of the relaying station, beyond the bus F (Fig. 1) to which the line is connected at the relaying station.

The zero-sequence timer 44 is normally short circuited by back contacts 53 on the second overcurrent element 43, so that, upon the actuation of the second overcurrent element 43, the timer will close its contacts 54 after a predetermined time delay similar to the delay associated with the first timer-contacts 32 of the previously described timer 18.

The ground relay connections are made so as to energize the tripping circuit 36 instantaneously in response to actuations of the zero-sequence directional element 41 and the first zero-sequence overcurrent element 42, the circuit being completed through the operating coil of a contactor 55 which is similar to the contactor 39 previously described. The tripping circuit 36 is energized, with time delay, through a circuit which is completed through the timer-contacts 54, the second overcurrent relay contacts 51, and the directional element contacts 52, and the timer-contacts 54 are connected across the two circuits 36 and 37, as in the case of the phase relays previously described.

According to our invention, we provide means for short circuiting the first timer-contacts, that is, for providing a connection between the tripping circuit 36 and the relay circuit 37, whenever the condition of the relays at the other end of the line-section being protected is such as to indicate that a fault exists in said line section, between the two ends thereof. With line-frequency-responsive relays, it is, in general, easy to secure an instantaneous indication or response dependent upon the location of the fault, for faults which are not too close to the far end of the line-section, as indicated by the first zone F—J in Fig. 1. For faults occurring in the short distance J—G, it has been customary, in line-frequency relaying, to utilize a second distance element which introduces an element of time delay which achieves the final selectivity between faults lying within the line-section, in the short distance J—G, and faults lying beyond the line-section, within the distance G—K of Fig. 1. This time delay feature is effective because, if the fault lies within the region G—K of Fig. 1, the first distance element of the relay at station 7 will operate instantaneously to open the circuit breaker at the station 7, thereby deenergizing the second impedance element at the station 5 before its associated timer has had time to close the first timer contacts.

In accordance with our invention, we supplement the action of the line-frequency-responsive relays at station 5 of Fig. 1 by means of a suitable intelligence-communicating channel which responds to conditions in the relaying and circuit-breaker station 6 at the other end of the line-section being protected. At this relaying station 6, it is a simple matter to determine, by the directional relay elements, whether the fault is in the zone G—J or in the zone G—K, so that, if a signal can be transmitted from the station 6 to the station 5, indicating that the fault is in the region to the left of the station G, rather than to the right of it in Fig. 1, the first timer element at the station 5 may safely be short circuited, permitting the circuit breaker at the station 5 to be tripped instantaneously in response to its second distance element, together with its directional element. At the same time, the interposition of the second distance element at the station 5, in series with the signal received through the communication channel from station 6, operates as a check on the communication channel and serves to prevent faulty relay operations as a result of possible faulty operation of the communicating channel at times when there is no fault at all in the second impedance zone F—K of the relaying equipment at station 5.

In Fig. 2, the communication channel is shown diagrammatically by means of a single pilot wire 60 which is assumed to be so located that there is no trouble from induced currents therein. Normally, both ends of the pilot wire 60 are grounded through back contacts 61 of duplicate relays 62 which are provided, one at each end of the pilot wire, that is, one at station 5 and one at station 6. The relay 62 is energized by means of a coil 63 which is connected in series-circuit relation in the tripping circuit 36. The pilot-wire relay 62 is provided also with front or "make" contacts 64 which connect the associated end of the pilot wire 60 with the positive terminal (+) of the station battery 35, the negative terminal (—) of which is grounded. The pilot-wire relay 62 is also provided with an auxiliary coil 65 which holds this relay in as long as current is flowing in the pilot wire, that is, until the ground connection at the far end of the pilot wire is broken by the actuation of the corresponding pilot wire relay 62 at the far end of the line section, that is, at the energization of a tripping circuit 36 at the far end of the line-section.

In series with the pilot wire 60 are the operating coils of two relays, namely an instantaneously operating polarized relay 67 which quickly closes its contact 68 whenever current is flowing in over the pilot wire from the far end thereof, and a slowly acting, or time-delay, relay 69 which responds slowly as indicated schematically by means of a dash-pot 70. The time-delay relay 69 is provided with a certain predetermined setting, which is usually of the order of one-half of a second, or a second, so as to allow ample time for all circuit-breaker operations if the pilot wire 60 is operated properly. At the end of this predetermined time, the time-delay relay 69 opens its back contacts 71 and closes its front contacts 72. The back contacts 71 of the time-delay relay 69, and the "make" contacts 68 of the polarized relay 67 are connected in series across the tripping circuit 36 and the relay circuit 37, so as to short circuit the first timer-contacts 32 and 54, thus causing instantaneous tripping of the circuit breaker 10 in response to the second distance elements and the directional elements of the relaying equipment at station 5.

It will be noted that as soon as the tripping circuit 36 is energized, the pilot-wire relay 62 at the station 5 will also be energized, thereby interrupting the ground connection to the pilot wire 60 at station 5, and thus interrupting the current which is coming in over the pilot wire from the station battery at the far end of the line-section being protected, thus deenergizing the serially-connected pilot wire receiving relays 67 and 69 at both ends of the pilot wire. It will be understood that the instantaneously operating contact members 68 of the polarized pilot-wire relays 67, at both ends of the pilot wire, are normally biased toward open position.

In the event of a faulty operation of the pilot wire, so that current, or, in general, a signal, is received over the pilot wire at a time when the second impedance element of the relays at station 5 are not actuated, an alarm signal circuit will be completed by means of the "make" contacts 72 of the time-delay pilot-wire relay 69, as indicated in Fig. 2.

In Fig. 3, we have shown a different form of communicating channel which utilizes a radio-frequency carrier current which is superimposed upon the line-section being protected. In Fig. 3, also, the signal which is transmitted over the carrier channel is a cessation of current, or a reduction of current below a predetermined minimum value, rather than the establishment of a current as in the pilot-wire system of Fig. 2. In the system shown in Fig. 3, a master oscillator tube 75 is provided, having a tuned oscillation circuit 76 which is tuned to the desired frequency, which may be somewhere in the range of approximately 50 to 110 kilocycles. The plate circuit of this oscillator tube normally receives power from an auxilary direct-current source which is represented, for the sake of simplicity, by means of an auxiliary battery 77 which may have a voltage higher than the station battery 35. An intermediate point of the battery 77 may be tapped off, as indicated at 78, to lead to the cathode circuit of the oscillator 75, as indicated. The oscillator grid circuit 79 is normally supplied by means of a grid leak 80, so that the tube normally oscillates and delivers power to the input circuit of a power amplifier 81 which is coupled to the output circuit of the master oscillator by means of a coupling capacitor 82. The output circuit of the power amplifier 81 is connected to a radio-frequency transformer 84, through which power is supplied to the phase conductors A and C of the transmission line 1, through coupling capacitors 85 and a tuning unit 86. The radio-frequency currents are confined to the line-section being protected, by means of carrier-current traps 87.

The high-frequency relaying current is received from the other end of the line-section by means of a tuned circuit 88 which is coupled to the radio-frequency transformer 84 by means of an auxiliary winding 89 thereon. When the transmitter 75—81 is operating, at the same time that the received radio-frequency currents come in from the other end of the line section, the receiver circuit 88 receives a much larger amount of current from its own transmitter than from the distant transmitter. In order to prevent the receiver from being damaged by such large current while still being sensitive to the received currents which come in when its own transmitter is not in operation, a protector tube 90 is utilized, across the receiver circuit 88, so as to break down whenever an excessive voltage is generated in said receiver circuit. When this protector tube 90 starts to pass current, it shunts the inductor coil 91 of the tuned receiver circuit 88 and, therefore, detunes said circuit, thus helping to prevent excessive energy from reaching the grid of the receiver tube 94. It will be understood that both ends of the line-section transmit currents of the same radio-frequency.

The receiver circuit 88 is coupled to a second tuned circuit 92 which energizes the grid circuit 93 of a receiver tube 94, the output circuit of which energizes an instantaneous receiver relay 95, the circuit of which is completed through a conductor 96 to intermediate tap 97 on the auxiliary battery 77. The cathode circuit of the receiver tube is connected to the intermediate tap 78 of said auxiliary battery 77. The grid circuit 93 of the receiver tube is normally biased by means of a potentiometer tap 98 energized from the station battery 35.

The receiver tube 94 thus receives energy not only from the transmitter at the distant end of the line-section, but also from its own transmitter at its own end of the line-section being protected. This is a necessary consequence of utilizing the same radio-frequency at both ends of the line-section being protected, which is done in order to prevent the complication of so many different tuned circuits. It is contemplated that a signal will be transmitted from one end of the line-section to the other by interrupting the radio-frequency signalling current which is superimposed on the line-section, so that if anything goes wrong with the high-frequency equipment, that fact will become known by the cessation of high-frequency currents.

As a result of the fact that the receiver tube 94 responds to its own transmitter as well as to the received currents coming from the distant transmitter at the other end of the line-section being protected, it is not feasible to transmit the signal, from one end of the line-section to the other, in response to the operation of the first instantaneous impedance element of the line-frequency relays, as in the system shown in Fig. 2. This is so because there is a distance range, J—G in Fig. 1, in which the first instantaneous distance element, 14 for example, will not respond, so that, for faults in this distance zone, the transmitter at the station 5 would not be shut off in response to the first instantaneous impedance element 14. The receiver, of course, cannot respond until both transmitters, at both ends of the line-section, are shut off.

In the system shown in Fig. 3, therefore, we transmit our signal, from one end of the line-section to the other, in response to the simultaneous actuation of the directional relay and the second impedance relay. In other words, we transmit our signal in response to the energizing of the relay circuit 37, the operation of which has already been described. When this relay circuit 37 is energized, by being connected to the grounded negative terminal (−) of the station battery 35, it energizes a transmitter-controlling relay 100, as shown in Fig. 3, and connects the grid circuit 79 of the oscillator 75 directly to the negative terminal (−) of the station battery 35, the positive terminal (+) of which is connected to the cathode of the oscillator tube 75. The strong negative potential thus impressed upon the grid circuit 79 stops the oscillations of the transmitter, thus interrupting the transmission of radio-frequency signalling currents as long as the transmitter-controlling relay 100 is energized, that is, until the circuit breaker 10 at the transmitter station is opened, so that it interrupts the tripping current flowing through the tripping circuit 36, thus causing the contactor 39 or 55, as the case may be, to drop out, thus deenergizing the relay circuit 37. The small current which is drawn by the transmitter-controlling relay 100 is not sufficient either to cause the contactor switch 39 or 55 to pick up or to maintain its holding circuit once it has picked up in response to the line-frequency relays.

The receiver relay 95 normally receives power at all times. When the transmitters at both ends of the line-section being protected are modulated, so that they both cease transmitting, or so that they cease transmitting sufficient current at the frequency to which the receiver responds, the receiver relay 95 instantly becomes deenergized and makes two separate contacts 102 and 103. The contacts 102 serve to energize the actuating coil of a time-delay relay 105 which picks up only slowly, as indicated by the dash-pot 106, and as described in connection with the time-delay relay 69 of Fig. 2. After an appreciable time delay, as described in connection with the aforesaid relay 69, the time-delay relay 105 responds to open its contacts 107 and to close its contacts 108. When the receiver relay 95 responds to a signal, namely the cessation of a sufficient received current therein, its instant closure of the contacts 103 is utilized to short circuit the first timer-contacts 32 and 54 of the line-frequency relays, this short-circuit connection being completed from the tripping circuit 36 through the back contacts 107 of the time-delay relay 105 and the contacts 103 of the instantaneously responding receiver relay 95, to the relay circuit 37.

As soon as the circuit breaker 10 at the station 5 opens, it deenergizes the contactor 39 or 55, whichever one has been in operation, thereby deenergizing the transmitter-controlling relay 100 and permitting the transmitter tube 75 to begin oscillating again, thereby again placing high-frequency carrier-current on the line and also feeding high-frequency carrier current into the receiver circuit 88 so as to reenergize the receiver tube 94 so that the latter supplies current to the relay 95, thus opening the receiver relay contacts 102 and 103 and deenergizing the time-delay relay 105 so that the latter does not have sufficient time to close its contacts 108. If, however, the circuit breaker 10 had not opened, the time-delay relay contacts 108 would have been closed, thereby energizing an alarm circuit, as indicated.

In the system shown in Fig. 3, the carrier-current transmission will be instantaneously interrupted, or substantially interrupted, upon the occurrence of any fault within the zone F—K of Fig. 1. However, the receiver tubes 94, at the two ends of the line-section, will not cease to receive sufficient radio-frequency current as long as the transmitter at the other end of the line-section is still transmitting, that is, the transmitter at the station 6 of Fig. 1. As previously described, the relaying equipment at station 6, which is identical with that shown for station 5, will not respond to faults in the region G—K, outside of the line-section being protected, because of the directional relays which will not respond except for faults on the left of the station G. Thus the receiver relay 95 is not actuated (by being deenergized) unless the transmitters, at stations 5 and 6, become simultaneously deenergized, indicating that the fault lies both within the zone F—K and within the zone G—N, which means that the fault lies within the line-section F—G.

In case the receiver tube 94 should fail, the receiver relay 95 would operate, dropping its contacts, even though radio-frequency current still appeared on the line 1. In such event, the time-delay relay 105 would be energized, and after its predetermined time interval of one-half of a second, or one second, it would not only disconnect the high-frequency relaying response, by opening the timer-short-circuit at 107, but it would also give an alarm by the closure of its contacts 108.

We have also shown a transmitter-supervisory tube 110, which is loosely coupled to the transmitter at 111, to operate as a detector tube, whenever the transmitter 75—81 is operating, so as to supply current to a transmitter-supervisory relay 112. When this relay ceases to receive sufficient current, due to the cessation of transmission, it closes its contacts 113 and actuates the time-delay relay 105. If the failure of transmission were due to the operation of the transmitter-controlling relay 100, the circuit breaker 10 would open within its appointed time, thus deenergizing the transmission-controlling relay 100 and reestablishing the transmission of radio-frequency current, so as to reenergize the transmission-supervisory relay 112 and deenergize the time-delay relay 105 before the latter had time to move its contacts. If the cessation of transmission had been due to a failure of the transmission mechanism, however, the time-delay relay 105 would remain energized and operate, as above described, to disconnect the high-frequency relay control at 107 and to give an alarm at 108. It will be understood that the transmitter-supervisory tube 110 will be adjusted so that it will not respond to the relatively small high-frequency currents received over the transmission line from the other end, when the transmitter at the station 105 is not functioning.

In Fig. 3 we have shown a multiple-circuit transmission system in which the line 1 is paralleled by a second line 115, these two lines or circuits being bussed together at the relaying stations F, G, etc. It will be understood that each line-section will have its own individual relaying equipment.

While we have described and illustrated our invention in two preferred forms of embodiment, it will be understood that such description and illustration are intended only for the purpose of explaining the principles of our invention, and that various modifications and changes may be made by those skilled in the art without departing from the essential spirit of the invention. We desire, therefore, that the appended claims shall be accorded the broadest construction consistent with their language and the prior art.

We claim as our invention:

1. Protective equipment for a transmission line section, comprising line-sectionalizing circuit-interrupter means and relaying means therefor at each end of the line-section being protected, each of said relaying means including a first quick-acting relaying means for actuating its associated circuit-interrupter means in selective response to faults out on the line being protected and up to less than the whole of the distance between said relaying means and the other end of the line-section being protected, time-delay means and a second quick-acting relaying means jointly effective for also actuating said associated circuit-interrupter means, said second quick-acting relaying means being selectively responsive to faults out on the line being protected and up to more than the whole of the distance between said relaying means and the other end of the line-section being protected, in combination with means quickly operative at each end of the line-section being protected, in response to the relaying means at that end, for transmitting a signal to the other end of the line-section, and receiver means at each end, responsive to said transmitted signal, for quickly short-circuiting the time-delay means at that end.

2. The invention as defined in claim 1, characterized by means associated with the receiver means at each end of the line-section for automatically removing said short-circuit from the time-delay means at the end of a predetermined time.

3. The invention as defined in claim 1, characterized by means associated with the receiver means at each end of the line-section for automatically removing said short-circuit from the time-delay means, locking out said receiver means, and giving an alarm, all at the end of a predetermined time, and means disposed at each end of the line-section for responding to the actuation of the circuit-interrupter means at its own end of the line-section to prevent the giving of said alarm at said end.

4. Protective equipment for a transmission line section, comprising line-sectionalizing circuit-interrupter means and relaying means therefor at each end of the line-section being protected, each of said relaying means including a first quick-acting relaying means for actuating its associated circuit-interrupter means in selective response to faults out on the line being protected and up to less than the whole of the distance between said relaying means and the other end of the line-section being protected, time-delay means and a second quick-acting relaying means jointly effective for also actuating said associated circuit-interrupter means, said second quick-acting relaying means being selectively responsive to faults out on the line being protected and up to more than the whole of the distance between said relaying means and the other end of the line-section being protected, in combination with signalling means at each end of the line-section being protected for normally transmitting a signalling current, receiver means at each end of the line-section for receiving the signalling current transmitted from the other end, each of said receiver means having contact means for quickly short-circuiting the time-delay means at its end in response to a cessation of a sufficient received current, and means quickly operative at each end of the line-section being protected, in response to the relaying means at that end, for so affecting said signalling means at that end as to cause the receiving means at the other end to fail to receive its sufficient received current.

5. Protective equipment for a transmission line section, comprising line-sectionalizing circuit-interrupter means and relaying means therefor at each end of the line-section being protected, each of said relaying means including a first quick-acting relaying means for actuating its associated circuit-interrupter means in selective response to faults out on the line being protected and up to less than the whole of the distance between said relaying means and the other end of the line-section being protected, time-delay means and a second quick-acting relaying means jointly effective for also actuating said associated circuit-interrupter means, said second quick-acting relaying means being selectively responsive to faults out on the line being protected and up to more than the whole of the distance between said relaying means and the other end of the line-section being protected, in combination with signalling means at each end of the line-section being protected for normally transmitting a high-frequency signalling current over the transmission line, receiver means at each end of the line-section for receiving a signalling current coming partially from its own transmitter and partially from the transmitter at the other end, each of said receiver means having contact means for quickly short-circuiting the time-delay means at its end in response to a cessation of a sufficient received current, and means quickly operative at each end of the line section being protected, in response to the relaying means at that end, for so affecting the transmitter at that end as to cause the receiving means at the other end to fail to receive its sufficient received current from said transmitter.

6. The invention as defined in claim 5, characterized by means associated with the receiver means at each end of the line-section for automatically removing said short-circuit from the time-delay means at the end of a predetermined time.

7. The invention as defined in claim 5, characterized by means associated with the receiver means at each end of the line-section for automatically removing said short-circuit from the time-delay means, and giving an alarm, all at the end of a predetermined time, and means disposed at each end of the line-section for responding to the actuation of the circuit-interrupter means at its own end of the line-section to prevent the giving of said alarm at said end.

8. The invention as defined in claim 5, characterized by means associated with the receiver means at each end of the line-section for automatically making it impossible for said receiver means to short-circuit said time-delay means and giving an alarm in response to the failure of said transmitter for the duration of a predetermined period of time.

9. Protective equipment for a transmission line section, comprising line-sectionalizing circuit-interrupter means and relaying means therefor at each end of the line-section being protected, each of said relaying means including a first quick-acting relaying means for actuating its associated circuit-interrupter means in selective response to faults out on the line being protected and up to less than the whole of the distance between said relaying means and the other end of the line-section being protected, time-delay means and a second quick-acting relaying means jointly effective for also actuating said associated circuit-interrupter means, said second quick-acting relaying means being selectively responsive to faults out on the line being protected and up to more than the whole of the distance between said relaying means and the other end of the line-section being protected, in combination with means quickly operative at each end of the line-section being protected, in response to the second relaying means at that end, for transmitting a signal to the other end of the line-section, and receiver means at each end, responsive to said transmitted signal, for quickly short-circuiting the time-delay means at that end.

10. Protective relaying equipment for effecting a control of line-sectionalizing circuit-interrupter means for a transmission line section, comprising, at each end of the line-section being protected, relaying means including a first directionally responsive quick-acting relaying means for responding selectively to faults out on the line being protected and up to less than the whole of the distance between said relaying means and the other end of the line-section being protected, a second directionally responsive quick-acting relaying means for responding selectively to faults out on the line being protected and up to more than the whole of the distance between said relaying means and the other end of the line-section being protected, time-delay means, a circuit-interrupter circuit adapted, when energized, to effect a circuit-interrupting control-operation, means for energizing said circuit-interrupter circuit in response to said first directionally responsive quick-acting relaying means, means for energizing said circuit-interrupter circuit jointly in response to both said time-delay means and said second directionally responsive quick-acting relaying means, a normally continuously operating transmitter for normally transmitting a signalling current which is substantially independent of the line-frequency power current, so far as relaying is concerned, a signal-current receiver for normally responding selectively to the signalling current of said line-section and for quickly changing its condition in response to the cessation of a sufficient received signalling current, transmitter-controlling means quickly operative, in response to a direction- and fault-responsive relaying means, for quickly causing an interruption of the transmission of effective signaling currents by said transmitter, and means responsive to conditions existing upon a cessation of a sufficient received signalling current to quickly short-circuit the time-delay means.

11. The invention as defined in claim 10, characterized by means associated with the receiver means at each end of the line-section for automatically removing said short-circuit from the time-delay means at the end of a predetermined time.

12. The invention as defined in claim 10, characterized by means associated with the receiver means at each end of the line-section for automatically removing said short-circuit from the time-delay means, and giving an alarm, all at the end of a predetermined time, and means disposed at each end of the line-section for responding to the actuation of the circuit-interrupter means at its own end of the line-section to prevent the giving of said alarm at said end.

13. The invention as defined in claim 10, characterizd by means associated with the receiver means at each end of the line-section for automatically making it impossible for said receiver means to short-circuit said time-delay means and giving an alarm in response to the failure of said transmitter for the duration of a predetermined period of time.

14. Protective equipment for a transmission line section, comprising line-sectionalizing circuit-interrupter means and relaying means therefor at each end of the line-section being protected, each of said relaying means including a first quick-acting relaying means for actuating its associated circuit-interrupter means in selective response to faults out on the line being protected and up to less than the whole of the distance between said relaying means and the other end of the line-section being protected, time-delay means and a second quick-acting relaying means jointly effective for also actuating said associated circuit-interrupter means, said second quick-acting relaying means being selectively responsive to faults out on the line being protected and up to more than the whole of the distance between said relaying means and the other end of the line-section being protected, in combination with means quickly operative at each end of the line-section being protected, in response to the actuation of the circuit-interrupter means at that end, for transmitting a signal to the other end of the line-section, and receiver means at each end, responsive to said transmitted signal, for quickly short-circuiting the time-delay means at that end.

15. Protective equipment for a transmission line section, comprising line-sectionalizing circuit-interrupter means and relaying means therefor at each end of the line-section being protected, each of said relaying means including a directional relay responsive to the feeding of power current into the line being protected, a fault-responsive relay responsive to faults on the line being protected and up to more than the whole of the distance between said relaying means and the other end of the line-section being protected, a relay circuit, and means for quickly energizing said relay circuit in response to the simultaneous actuation of both the directional relay and the fault-responsive relay and for deenergizing said relay circuit when either the directional relay or the fault-responsive relay is in its unresponsive position, in combination with means disposed at each end of the line-section being protected for continuously superimposing a special-frequency relaying current on the line in response to a deenergized condition of its relay circuit at that end and for substantially removing said special-frequency relaying current in response to an energized condition of said relay circuit at said end, and means at each end of the line-section for responding to the simultaneous substantial removals of the special-frequency relaying currents from both ends of the line-section for quickly actuating said circuit-interrupter means.

16. Protective equipment for a transmission line section, comprising line-sectionalizing circuit-interrupter means and relaying means therefor at each end of the line-section being protected, signal-transmitting means for normally transmitting from each end of the line-section a signalling current, fault-responsive means at each end for rendering the signal transmission substantially ineffective at that end, and receiver means at each end, responsive to the cessation of a sufficient received signalling current, for causing the said relaying means at its own end to respond more sensitively.

17. Protective equipment for a transmission line section, comprising circuit-interrupter means and relaying means therefor at each end of the line-section being protected, each of said relaying means including a directional relay means responsive to the feeding of power current into the line-section, a fault-responsive relay means responsive to faults on the line, a normally energized auxiliary relay means at each end of the line-section for interposing an impediment against the actuation of said circuit-interrupter means, a control circuit for said circuit-interrupter means, including, in series, contacts of said directional relay means, said fault-responsive relay means, and said auxiliary relay means, and controlling means for deenergizing said auxiliary relay means in response to the simultaneous actuation of both the directional relay means and the fault-responsive relay means at both ends of the line-section.

18. The invention as defined in claim 17, characterized by said controlling means including a carrier-current transmitter and a carrier-current receiver at each end of the line-section.

19. The invention as defined in claim 17, characterized by said controlling means including carrier-current transmitters and receivers, all of substantially the same carrier-current frequency, at the respective ends of the line-section.

20. Protective equipment for a transmission line section, comprising line-sectionalizing circuit-interrupter means and relaying means therefor at each end of the line-section being protected, each of said relaying means including quick relaying means directionally responsive to certain faults out on the line being protected for quickly actuating its associated circuit-interrupter means, time-delay relaying means directionally responsive to other faults out on the line being protected for actuating its associated circuit-interrupter means after a predetermined time-delay, means for providing an intelligence-communicating channel between the two ends of the line-section being protected, auxiliary means associated with said intelligence-communicating channel for selectively responding to conditions of faults somewhere between the two ends of the particular line-section being protected for so modifying the action of said time-delay relaying means as to substantially eliminate its time-delay element, and means for safeguarding against faulty operation of said auxiliary means by locking out said auxiliary means and giving an alarm if said auxiliary means modifies the action of said time-delay relaying means for the duration of a predetermined time.

21. Protective relaying equipment for effecting a control of line-sectionalizing circuit-interrupter means for a transmission line section, comprising, at each end of the line-section being protected, a normally-continuously operating high-frequency transmitter for normally continuously superimposing on the line-section a high-frequency current which is substantially independent of the line-frequency power current, so far as relaying is concerned, a high-frequency receiver for normally responding selectively to high-frequency superimposed currents on the line-section and for quickly changing its condition in response to the cessation of sufficient received high-frequency currents, a directional means for selectively responding to a power-current direction into the line-section being protected, a circuit including, in series, contacts of said receiver and said directional means for effecting a circuit-interrupter controlling operation only when the receiver fails to receive its sufficient high-frequency current and when the power-current direction is at the same time into the line-section, fault-responsive means for selectively responding only to a fault on the line, and transmitter-controlling means responsive only to the simultaneous response of said directional means and said fault-responsive means for quickly causing an interruption of the transmission of effective high-frequency currents by said transmitter.

22. Protective relaying equipment for effecting a control of line-sectionalizing circuit-interrupter means for a transmission line-section, comprising, at each end of the line-section being protected, relaying means including a directionally responsive relaying means for responding selectively to faults accompanied by current-flow into the protected line-section, a communicating channel between the two ends of the line-section being protected, a transmitter means disposed at each end of the line-section for normally continuously transmitting a signalling current through said communicating channel to the other end of the line-section, transmitter-controlling means responsive to said directionally responsive relaying means for causing said transmitter to cease transmitting effective signalling currents, a receiver disposed at each end of the line-section and associated with said communication channel, means at each end, responsive to a failure of the receiver to receive a sufficient signalling current, and responsive also to the direction of current-flow into the line-section being protected, for energizing a control circuit for the circuit-interrupter means, and time-delay means responsive to an ineffectual sustained failure of the receiver to receive a sufficient signalling current, for giving an alarm.

23. Protective relaying equipment for effecting a control of line-sectionalizing circuit-interrupter means for a transmission line-section, comprising, at each end of the line-section being protected, relaying means including a directionally responsive relaying means for responding selectively to faults accompanied by current-flow into the protected line-section, a communicating channel between the two ends of the line-section being protected, transmitter means disposed at each end of the line-section for normally continuously transmitting a signalling current through said communicating channel to the other end of the line-section, transmitter-controlling means responsive to said directionally responsive relaying means for causing said transmitter to cease transmitting effective signalling currents, a receiver disposed at each end of the line-section and associated with said communication channel, means at each end, responsive to a failure of the receiver to receive a sufficient signalling current, and further responsive to the actual presence of a fault on the transmission line, and responsive also to the direction of current flow into the line-section being protected, for energizing a control circuit for the circuit-interrupter means, and time-delay means responsive to an ineffectual sustained failure of the receiver to receive a sufficient signalling current, for giving an alarm.

24. Protective equipment for a transmission line-section, comprising line-sectionalizing circuit-interrupter means and relaying means therefor at each end of the line-section being protected, each of said relaying means including quick relaying means directionally responsive to certain faults accompanied by current-flow into the protected line-section, time-delay tripping-means associated with each of said fault-responsive relaying means for actuating its associated circuit-interrupter means after a time-delay, means for providing an intelligence-communicating channel between the two ends of the line-section being protected, and auxiliary means associated with said intelligence-communicating channel for selectively responding to conditions of faults somewhere between the two ends of the particular line-section being protected for so modifying the action of said time-delay relaying means as to substantially eliminate its time-delay element.

25. Protective equipment for a transmission line-section, comprising line-sectionalizing circuit-interrupter means and relaying means therefor at each end of the line-section being protected, each of said relaying means including quick relaying means directionally responsive to certain faults accompanied by current-flow into the protected line-section, and time-delay tripping-means associated with each of said fault-responsive relaying means for actuating its associated circuit-interrupter means after a time-delay, in combination with transmitter means at each end of the line-section being protected for normally transmitting a signalling current, receiver means at each end of the line-section for receiving the signalling current transmitted from the other end, each of said receiver means having contact means for quickly short-circuiting the time-delay means at its end in response to a cessation of a sufficient received current, and means quickly operative at each end of the line-section being protected, in response to the relaying means at that end, for so affecting said transmitter signalling means at that end as to cause the receiving means at the other end to fail to receive its sufficient received current from the transmitter at the first end.

26. The invention as defined in claim 25, characterized by timer means disposed at each end of the protected line-section and operative, after a delay, in response to a cessation of sufficient received current, unaccompanied by a tripping function at that end, to discontinue the short-circuiting of the time-delay tripping-means and to give an indication of signalling-current failure.

27. The invention as defined in claim 25, characterized by a transmitter-supervisory relay responsive to the transmission of signalling current at each end of the protected line-section, and timer means disposed at each end of the protected line-section and operative, after a delay, in response to a deenergization of the transmitter-supervisory relay at that end, unaccompanied by a tripping function at that end, to give an indication of signalling-current failure and to thereafter make it impossible for the receiver means to short-circuit the time-delay tripping-means at that end.

28. Protective equipment for a transmission line-section, comprising line-sectionalizing circuit-interrupter means and relaying means therefor at each end of the line-section being protected, each of said relaying means including relaying means directionally responsive to certain faults accompanied by current-flow into the protected line-section, in combination with transmitter means at each end of the line-section being protected for normally transmitting a signalling current, receiver means at each end of the line-section for receiving the signalling current transmitted from its own end as well as the other end, each of said receiver means having contact means for actuating its associated circuit-interrupter means in response to a cessation of a sufficient received current, and means operative at each end of the line-section being protected, in response to the relaying means at that end, for so affecting said transmitter signalling means at that end as to cause the receiving means at each end to fail to receive its sufficient received current from the transmitter in question.

29. Protective equipment for a transmission line-section, comprising line-sectionalizing circuit-interrupter means and relaying means therefor at each end of the line-section being protected, each of said relaying means including quick relaying means directionally responsive to certain faults accompanied by current flow into the protected line-section, and time-delay tripping-means associated with each of said fault-responsive relaying means for actuating its associated circuit-interrupter means after a time-delay, in combination with transmitter means at each end of the line-section being protected for normally transmitting a signalling current, receiver means at each end of the line-section for receiving the signalling current transmitted from its own end as well as the other end, each of said receiver means having contact means for short-circuiting the time-delay means at its end in response to a cessation of a sufficient received current, and means operative at each end of the line-section being protected, in response to the relaying means at that end, for so affecting said transmitter signalling means at that end as to cause the receiving means at each end to fail to receive its sufficient received current from the transmitter in question.

30. The invention as defined in claim 29, characterized by timer means disposed at each end of the protected line-section and operative, after a delay, in response to a cessation of sufficient received current, unaccompanied by a tripping function at that end, to discontinue the short-circuiting of the time-delay tripping means and to give an indication of signalling-current failure.

31. The invention as defined in claim 29, characterized by a transmitter-supervisory relay responsive to the transmission of signalling current at each end of the protected line-section, and timer means disposed at each end of the protected line-section and operative, after a delay, in response to a deenergization of the transmitter-supervisory relay at that end, unaccompanied by a tripping function at that end, to give an indication of signalling-current failure and to thereafter make it impossible for the receiver means to short-circuit the time-delay tripping-means at that end.

32. Protective equipment for a transmission-line section, comprising line-sectionalizing circuit-interrupter means at each end of the line-section being protected, fault-responsive directional relaying means at each end for responding in a predetermined manner to fault-conditions when the fault-current is flowing into the line-section at that end and for causing a line-sectionalizing operation of the circuit-interrupter means at said end in accordance with, and as a result of, the aforesaid response, fault-responsive directional signalling means at each end for transmitting a signal to the other end of the line-section when the fault-current is flowing into the line-section at the end where the signalling means is located, and receiver means at each end, responsive to said transmitted signal, for causing the relaying means at its own end to respond in an altered manner to fault-conditions and to cause a line-sectionalizing operation of the circuit-interrupter means at said end in accordance with, and as a result of, the aforesaid altered response.

33. Protective equipment for a transmission-line section, comprising line-sectionalizing circuit-interrupter means at each end of the line-section being protected, fault-responsive directional relaying means at each end for responding in a predetermined manner to fault-conditions when the fault-current is flowing into the line-section at that end and for causing a line-sectionalizing operation of the circuit-interrupter means at said end in accordance with, and as a result of, the aforesaid response, fault-responsive directional signalling means at each end for transmitting a signal to the other end of the line-section when the fault-current is flowing into the line-section at the end where the signalling means is located, and receiver means at each end, responsive to said transmitted signal, for causing the relaying means at its own end to instantaneously respond more sensitively to fault-conditions and to cause a line-sectionalizing operation of the circuit-interrupter means at said end in accordance with, and as a result of, the aforesaid more sensitive response.

34. Protective equipment for a transmission-line section, comprising line-sectionalizing circuit-interrupter means at each end of the line-section being protected, fault-responsive directional relaying means at each end for responding in a predetermined manner to fault-conditions when the fault-current is flowing into the line-section at that end and for causing a line-sectionalizing operation of the circuit-interrupter means at said end in accordance with, and as a result of, the aforesaid response, fault-responsive directional signalling means at each end for transmitting a signal to the other end of the line-section when the fault-current is flowing into the line-section at the end where the signalling means is located, and receiver means at each end, responsive to said transmitted signal, for causing the relaying means at its own end to respond more quickly to certain faults and to cause a line-sectionalizing operation of the circuit-interrupter means at said end in accordance with, and as a result of, the aforesaid quickened response.

WILLIAM A. LEWIS.
ROBERT D. EVANS.

DISCLAIMER 2,044,174.—*William A. Lewis*, Wilkinsburg, Pa., and *Robert D. Evans*, Swissvale, Pa. PROTECTIVE RELAY SYSTEM. Patent dated June 16, 1936. Disclaimer filed June 16, 1936, by the assignee, *Westinghouse Electric & Manufacturing Company*.

Hereby disclaims claim 28.

[*Official Gazette July 7, 1936.*]

CERTIFICATE OF CORRECTION.

Patent No. 2,044,174.                                                                                           June 16, 1936.

WILLIAM A. LEWIS, ET AL.

It is hereby certified that error appears in the above numbered patent requiring correction as follows: In the drawings, Sheet 2, Fig. 3, the broken vertical line indicating the tripping-circuit conductor 36 should appear as a continuous unbroken vertical line at the point near the switch contacts 32 and 33; and that the said Letters Patent should be read with this correction therein that the same may conform to the record of the case in the Patent Office.

Signed and sealed this 26th day of January, A. D. 1937.

Henry Van Arsdale (Seal)                                               Acting Commissioner of Patents.